United States Patent
Ravindar et al.

(10) Patent No.: US 10,613,844 B2
(45) Date of Patent: Apr. 7, 2020

(54) USING COMMENTS OF A PROGRAM TO PROVIDE OPTIMIZATIONS

(71) Applicant: INTERNATIONAL BUSINESS MACHINES CORPORATION, Armonk, NY (US)

(72) Inventors: Archana Ravindar, Lower Palace Orchards (IN); Ulrich Weigand, Tuebingen (DE); Srinivas R. Vaidya, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 15/809,092

(22) Filed: Nov. 10, 2017

(65) Prior Publication Data

US 2019/0146764 A1 May 16, 2019

(51) Int. Cl.
*G06F 9/44* (2018.01)
*G06F 8/41* (2018.01)
*G06N 20/00* (2019.01)

(52) U.S. Cl.
CPC .............. *G06F 8/443* (2013.01); *G06N 20/00* (2019.01); *G06F 8/423* (2013.01)

(58) Field of Classification Search
CPC . G06F 8/425; G06F 8/427; G06F 8/44; G06F 8/443; G06F 8/44505
See application file for complete search history.

(56) References Cited

U.S. PATENT DOCUMENTS

| | | | | |
|---|---|---|---|---|
| 5,813,019 A | * | 9/1998 | Van De Vanter | G06F 8/425 715/236 |
| 6,353,925 B1 | * | 3/2002 | Stata | G06F 8/427 704/9 |
| 6,357,040 B1 | * | 3/2002 | Porter | G06F 9/44505 717/154 |
| 8,631,385 B2 | * | 1/2014 | Ali | G06F 8/35 717/104 |

(Continued)

FOREIGN PATENT DOCUMENTS

| CN | 1823322 A | 8/2006 |
|---|---|---|
| CN | 103064720 A | 4/2013 |

(Continued)

OTHER PUBLICATIONS

Corazza, A., et al., "On the Coherence between Comments and Implementations in Source Code," 2015 41st Euromicro Conference on Software Engineering and Advanced Applications, Funchal, Jun. 2015, pp. 76-83.

(Continued)

*Primary Examiner* — Duy Khuong T Nguyen
(74) *Attorney, Agent, or Firm* — Noah Sharkan, Esq.; Blanche E. Schiller, Esq.; Heslin Rothenberg Farley & Mesiti P.C.

(57) ABSTRACT

A translation component, such as a compiler, recognizes comments of a program and uses those comments to provide optimization recommendations or to generate optimized code to improve processing within a computing environment. The comments are translated into structures recognizable by translation phases to generate more efficient code or pragmas to improve performance.

17 Claims, 9 Drawing Sheets

(56) References Cited

U.S. PATENT DOCUMENTS

| | | | |
|---|---|---|---|
| 2010/0262779 A1* | 10/2010 | Potkonjak | G06F 8/4432 711/118 |
| 2011/0077933 A1* | 3/2011 | Miyamoto | G06F 17/289 704/2 |
| 2011/0119657 A1 | 5/2011 | Vorbach et al. | |
| 2013/0212568 A1* | 8/2013 | Huang | G06F 8/458 717/146 |
| 2015/0234642 A1* | 8/2015 | Araya | G06F 8/51 717/137 |
| 2016/0179654 A1* | 6/2016 | Cox | G06F 11/34 717/127 |
| 2017/0102967 A1 | 4/2017 | Tian et al. | |
| 2017/0123762 A1 | 4/2017 | Drukman | |

FOREIGN PATENT DOCUMENTS

| | | |
|---|---|---|
| CN | 105103148 A | 11/2015 |
| EP | 2315118 B1 | 6/2017 |

OTHER PUBLICATIONS

Corazza, A., et al., "Using Machine Learning and Information Retrieval Techniques to Improve Software Maintainability," Trustworthy Eternal Systems via Evolving Software, Data and Knowledge, Jan. 2013. pp. 1-6.

Fluri, B., et al., "Do Code and Comments Co-Evolve? On the Relation between Source Code and Comment Changes," ser. WCRE '07, Oct. 2007, pp. 1-10.

Hsu, Chih-Wei et al., "A Comparison of Methods for Multi-class Support Vector Machines," IEEE Transactions on Neural Networks—vol. 13 Issue 2, Mar. 2002, pp. 1-26.

IBM, "Power IDS—V2.07B," Apr. 9, 2015, pp. 1-1527.

IBM, "z/Architecture—Principles of Operation," IBM Publication No. SA22-7832-10, Eleventh Edition, Mar. 2015, pp. 1-1732.

Kim, Yoon, "Convolution Neural Networks for Sentence Classification," Proceedings of the 2014 Conference on Empirical Methods in Natural Language processing (EMNLP), Oct. 2014, pp. 1746-1751.

Mc Callum, Andrew et al., "A Comparison of Event Models for Naïve Bayes Text Classification," EACL '03 Proceedings of the tenth conference on European chapter of the Association for Computational Linguistics—vol. 1, Apr. 2003, pp. 1-7.

Mel, Peter and Tim Grance, "The NIST Definition of Cloud Computing," National Institute of Standards and Technology, Information Technology Laboratory, Special Publication 800-145, Sep. 2011, pp. 1-7.

Steidl, Daniela, et al., "Quality Analysis of Source Code Comments," 2013 IEEE 21$^{st}$ International Conference on Program Comprehension, May 2013, pp. 1-10.

Tan, L., et al., "HotComments: How to Make Program Comments More Useful?" ser. HOTOS '07, Jan. 2007, pp. 1-6.

\* cited by examiner

OBTAIN, BY A TRANSLATION COMPONENT OF A PROCESSOR OF THE COMPUTING ENVIRONMENT, ONE OR MORE ENCODED COMMENTS TO BE USED BY THE TRANSLATION COMPONENT IN PROVIDING ONE OR MORE OPTIMIZATIONS TO OPTIMIZE PROCESSING WITHIN THE COMPUTING ENVIRONMENT — 400

THE ONE OR MORE ENCODED COMMENTS INCLUDE ONE OR MORE COMMENTS OF A COMPUTER PROGRAM DETERMINED TO HAVE INFORMATION TO BE PROVIDED TO THE TRANSLATION COMPONENT AND ENCODED TO PROVIDE THE ONE OR MORE ENCODED COMMENTS — 402

USE, BY THE TRANSLATION COMPONENT, THE ONE OR MORE ENCODED COMMENTS TO OPTIMIZE PROCESSING WITHIN THE COMPUTING ENVIRONMENT — 404

THE USING THE ONE OR MORE ENCODED COMMENTS INCLUDES USING THE ONE OR MORE ENCODED COMMENTS IN TRANSLATING CODE OF THE COMPUTER PROGRAM TO MACHINE-READABLE CODE — 406

THE MACHINE-READABLE CODE INCLUDES ONE OR MORE CODE OPTIMIZATIONS BASED ON THE ONE OR MORE ENCODED COMMENTS — 408

THE USING THE ONE OR MORE ENCODED COMMENTS INCLUDES USING THE ONE OR MORE ENCODED COMMENTS TO GENERATE A REPORT INDICATING ONE OR MORE CHANGES TO BE MADE TO THE COMPUTER PROGRAM TO OPTIMIZE PROCESSING — 409

BUILD A STRUCTURE, BASED ON OBTAINING THE ONE OR MORE ENCODED COMMENTS — 410

THE STRUCTURE INCLUDES A PLURALITY OF NODES — 412

THE PLURALITY OF NODES INCLUDE ONE OR MORE NODES FOR ONE OR MORE PROGRAM COMPONENTS OF THE COMPUTER PROGRAM AND ONE OR MORE NODES FOR THE ONE OR MORE ENCODED COMMENTS — 414

FIG. 4A

THE OBTAINING THE ONE OR MORE ENCODED COMMENTS INCLUDES OBTAINING THE ONE OR MORE ENCODED COMMENTS FROM A PREPROCESSING COMPONENT OF THE PROCESSOR — 420

DETERMINE, BY THE PREPROCESSING COMPONENT, THE ONE OR MORE COMMENTS OF THE COMPUTER PROGRAM TO BE RETAINED FOR USE BY THE TRANSLATION COMPONENT — 422

ENCODE, BY THE PREPROCESSING COMPONENT, THE ONE OR MORE COMMENTS TO PROVIDE THE ONE OR MORE ENCODED COMMENTS — 424

THE DETERMINING INCLUDES DETERMINING THAT THE ONE OR MORE COMMENTS SATISFY A CONFIDENCE THRESHOLD INDICATING THAT THE ONE OR MORE COMMENTS ARE PREDICTED TO HAVE INFORMATION USEFUL IN OPTIMIZING PROCESSING — 426

THE ENCODING INCLUDES PROVIDING, FOR A COMMENT OF THE ONE OR MORE COMMENTS, AN OPTIMIZATION CODE AND ONE OR MORE PARAMETERS FOR THE COMMENT, TO PROVIDE AN ENCODED COMMENT — 428

THE PREPROCESSING COMPONENT IS PART OF THE TRANSLATION COMPONENT OR SEPARATE FROM BUT COUPLED TO THE TRANSLATION COMPONENT — 430

FIG. 4B

USING COMMENTS OF A PROGRAM TO PROVIDE OPTIMIZATIONS

BACKGROUND

One or more aspects relate, in general, to processing within a computing environment, and in particular, to facilitating such processing.

Processing within a computing environment includes executing computer programs. A computer program instructs a computer in tasks to be performed. It is written by a programmer using a human-readable programming language, producing source code. Source code is a collection of computer instructions and may include comments describing the computer instructions and/or other aspects of the computer program. The human-readable source code is translated to machine-readable code using, for instance, a compiler.

The compiler transforms the source code into object code or machine code understandable by the computer. In transforming the source code, the compiler ignores the comments that may be present in the source code.

SUMMARY

In accordance with an aspect of the present invention, select comments are not ignored, but instead, considered when, for instance, compiling a program. The select comments include information that may be useful in providing recommendations to improve the program and/or other processing, and/or in generating improved program code.

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes, for instance, obtaining, by a translation component of a processor of the computing environment, one or more encoded comments to be used by the translation component in providing one or more optimizations to optimize processing within the computing environment. The one or more encoded comments include one or more comments of a computer program determined to have information to be provided to the translation component and encoded to provide the one or more encoded comments. The translation component uses the one or more encoded comments to optimize processing within the computing environment. By using the encoded comments to optimize processing, performance is improved.

As one example, the using the one or more encoded comments to optimize processing includes using the one or more encoded comments in translating code of the computer program to machine-readable code. The machine-readable code includes one or more code optimizations based on the one or more encoded comments. The code optimizations improve the code, which further improves processing within the computing environment.

As another example, the using the one or more encoded comments to optimize processing includes using the one or more encoded comments to generate a report indicating one or more changes to be made to the computer program to optimize processing. By generating the report, the computer program may be changed, improving the code, and therefore, improving processing within the computing environment.

In one embodiment, based on obtaining the one or more encoded comments, a structure is built. The structure includes a plurality of nodes, and the plurality of nodes include one or more nodes for one or more program components of the computer program and one or more nodes for the one or more encoded comments. This facilitates including certain optimizations when compiling the code.

As an example, the obtaining the one or more encoded comments includes obtaining the one or more encoded comments from a preprocessing component of the processor. The preprocessing component determines the one or more comments of the computer program to be retained for use by the translation component, and encodes the one or more comments to provide the one or more encoded comments.

The determining the one or more comments to be retained includes, for instance, determining that the one or more comments satisfy a confidence threshold indicating that the one or more comments are predicted to have information useful in optimizing processing.

The encoding includes, for instance, providing, for a comment of the one or more comments, an optimization code and one or more parameters for the comment, to provide an encoded comment.

As examples, the preprocessing component is part of the translation component, or is separate from but coupled to the translation component.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4B depict one embodiment of facilitating processing within a computing environment, in accordance with an aspect of the present invention;

DETAILED DESCRIPTION

Figure 1:
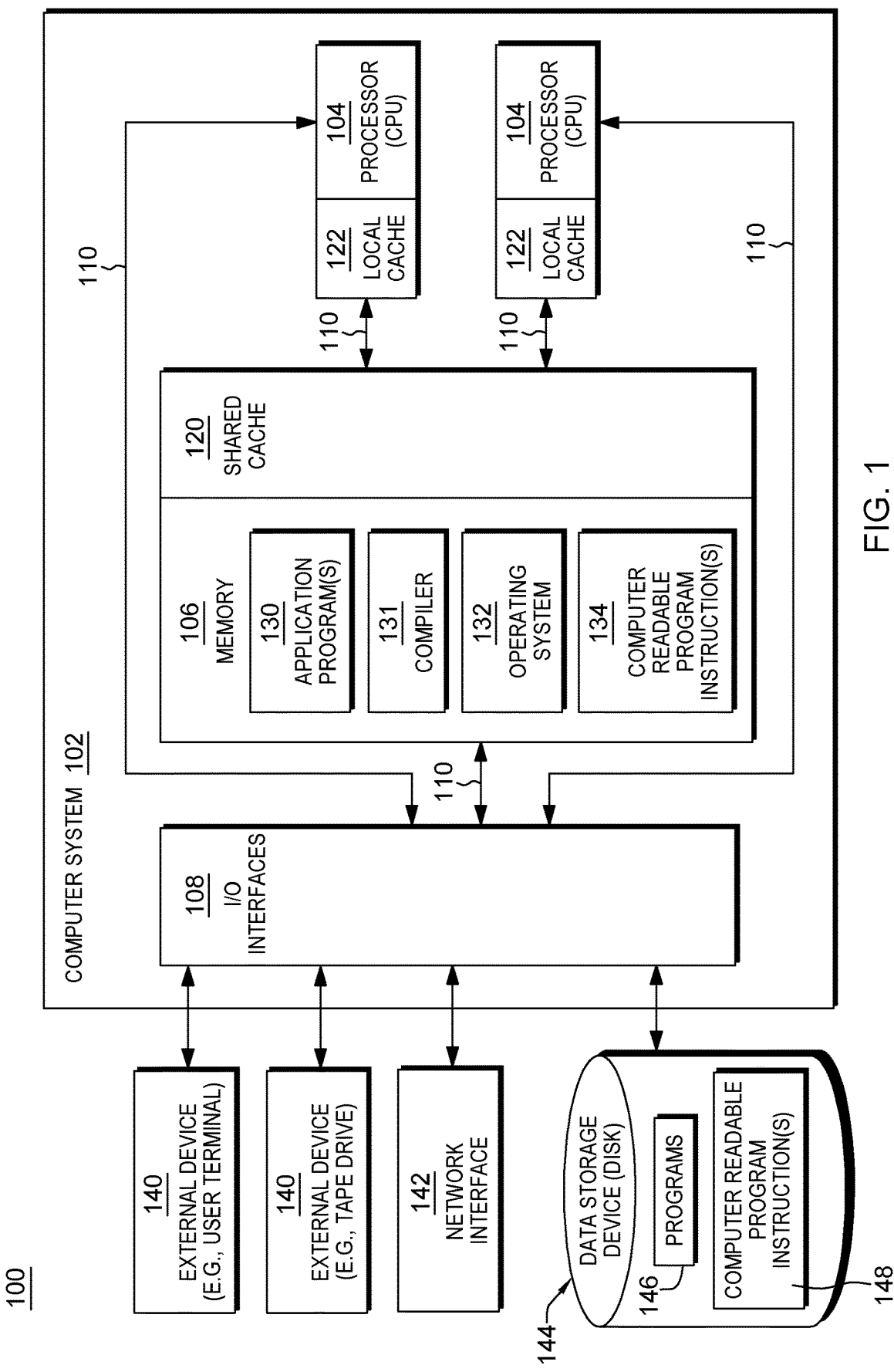
FIG. 1 depicts one example of a computing environment to incorporate and use one or more aspects of the present invention.

In accordance with an aspect of the present invention, a capability is provided to instruct a translation component to recognize select program comments in source code, rather than ignoring them. In the embodiments herein, the translation component is a compiler; however, in other embodiments, it may be an interpreter or other component that provides machine-readable code.

Program comments are known to serve as a documentation aid. However, it has been observed, in accordance with an aspect of the present invention, that program comments may provide useful information about functions, loops, branch clauses, statements and/or other aspects of the program, which cannot be ascertained directly by profilers or other performance analysis tools. This information, however, just stays in the program and is not utilized because compilers do not treat comments as an active entity during the compilation process. They are treated as white space and are discarded beyond the lexical analysis phase of compilation.

Thus, in accordance with an aspect of the present invention, a capability is provided to recognize comments that can be used by the compiler and treat them as other components of the program. In one example, a modified compiler is provided which translates these comments into structures recognizable by compiler phases, such that the compiler can generate more efficient code. The capability also includes translating comments into compiler flags or pragmas (a pragma is a compiler directive; data embedded in source code to indicate an intention to the compiler) that can be used to improve program performance wherever applicable. This capability may aid flag mining techniques that spend significant resources to determine the best set of flags to compile a given program.

By providing efficient code, processing within a computer is facilitated and improved. Optimizations provided by the efficient code improve processing within a computing environment.

Various aspects are described herein. Further, many variations are possible without departing from a spirit of aspects of the present invention. It should be noted that, unless otherwise inconsistent, each aspect or feature described herein and variants thereof may be combinable with any other aspect or feature.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, a compiler 131, an operating system 132, and one or more computer readable program instructions 134. Computer readable program instructions 134 may be configured to carry out functions of embodiments of aspects of the invention. Example compilers include XL (e.g., XL C, XL C++ offered by International Business Machines Corporation), GCC (GNU Compiler Collection), and LLVM. Other compilers are also possible.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As described above, a compiler, such as compiler 131, is used to transform source code into machine-readable code. To transform the source code, the compiler uses a plurality of phases of a compilation process. One example of various compilation phases is described with reference to FIG. 2.

Figure 2:
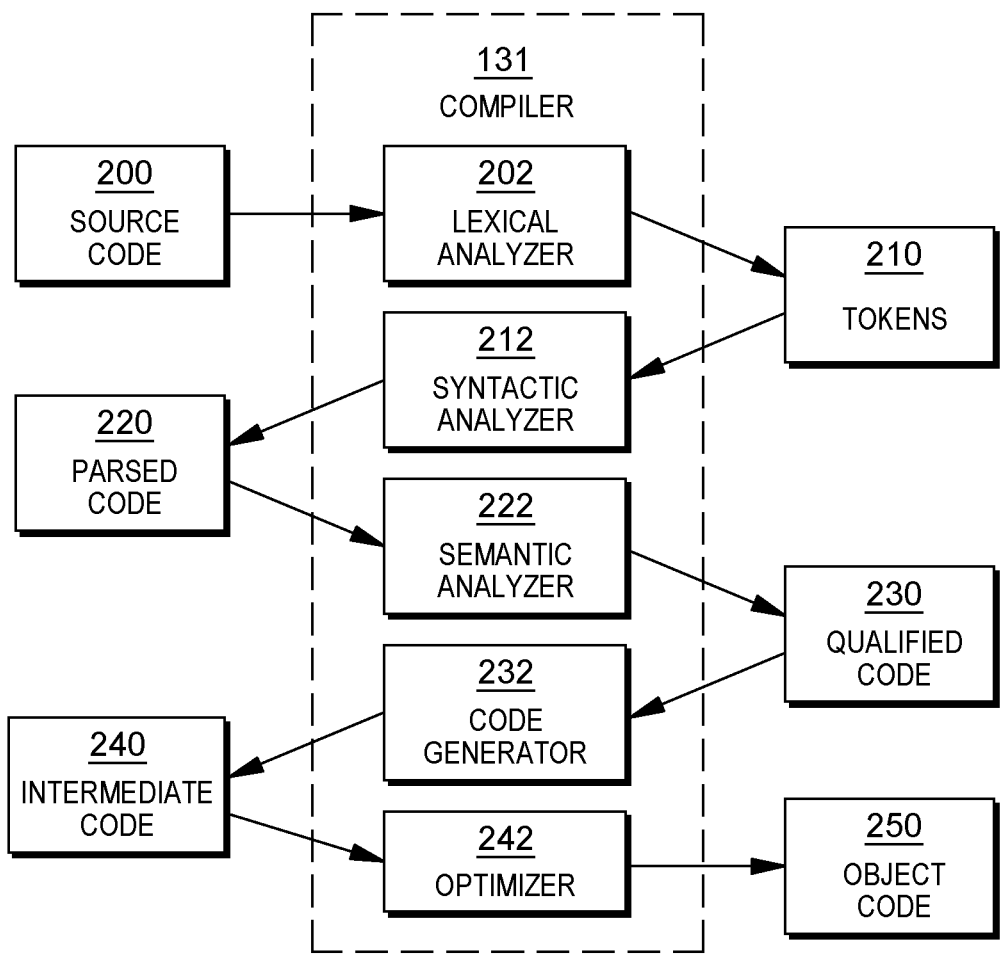
FIG. 2 depicts one example of various phases of a compiler used in accordance with an aspect of the present invention.

As depicted in FIG. 2, compiler 131 receives as input source code 200. For example, source code 200 is input to a lexical analyzer 202 of compiler 131. Lexical analyzer 202 decomposes source code 200 into a sequence of tokens 210. Tokens 210 are input to a syntactic analyzer 212 of compiler 131, which parses the token sequence to identify the syntactic structure of the program and generates parsed code 220. For instance, it may build a parse tree (also referred to herein as a syntax tree), which replaces the linear sequence of tokens with a tree structure. Parsed code 220 of the syntactic analyzer is input to a sematic analyzer 222, which adds semantic information to the parse tree and builds a symbol table. It performs semantic checks, object binding and/or variable assignment.

Output of semantic analyzer 222 is qualified code 230, which is input to a code generator 232, which generates intermediate code 240. Intermediate code 240 may be input to an optimizer 242 of compiler 131, which produces object code 250 to be executed.

The above phases of compiler 131 are just one example. The compiler may have more, fewer, and/or different phases. Further, one or more of the phases may be performed in a differing order. For instance, optimization may be performed prior to and/or subsequent to code generation. Other variations are possible.

In accordance with an aspect of the present invention, the compiler is modified to recognize and use comments of a program to provide optimized code and/or other optimizations within the environment. To facilitate this, in one aspect, a preprocessing phase is performed prior to the other compilation phases that classifies comments of a program written in a natural language (i.e., non-machine language, such as English or another language) and passes an encoding of select comments to, for instance, lexical analyzer 202, as described herein.

Since comments are written in a natural language, a machine learning technique, such as a supervised multiclass classification technique, is used to classify comments into two categories: one category that includes comments that provide useful information about the program that can help the compiler further optimize the program, and another category that includes comments that are not going to lead to opportunities for improvement of the application. The usefulness of the comments is determined based on a pre-determined threshold value. The comments in the one category are retained, and the comments in the other category are discarded.

The retained comments form a part of the program and proceed through the compilation phases up to the syntax or parse tree. Useful information from comments is passed through semantic attributes of the nodes which are used to provide recommendations to the user in terms of flags or pragmas that can be used to improve performance or provide optimal intermediate code and hence influence the binary created by the compiler. This technique can also be used to infer hot path behavior from comments and be passed on to the compiler. This is valuable in cases where customers do not have access to training inputs or find it difficult to construct training inputs which are available only in standard benchmark suites, such as SPEC programs.

To further explain, program comments written in a natural language are processed and used as triggers to compiler optimizations and as recommendations to the user in terms of compiler flags/pragmas/suggestions to a log file. This is achieved by pre-pending a preprocessor phase to the compilation phases that classifies the comments written in a natural language using, e.g., a supervised multiclass classifier technique. The preprocessing may be performed as part of the compiler or separate therefrom, in which the results of preprocessing are passed to the compiler.

In one example, comments are classified into two categories—one which may provide useful information to the compiler to optimize the code and the other which is useful for only documentation purposes. The comments that provide useful information to the compiler are encoded and retained in the program. The compiler processes these comments and translates them to optimizations or recommendations to the user. The phases of the compiler recognize such special comments and parses them to embed them within the syntax or parse tree. The nodes of the parse tree are associated with attributes, and the comment nodes pass on the information that can influence optimization in terms of attributes. The attribute information is selected from the comment nodes by the intermediate code generation phase of the compiler, which processes that information along with contextual information. Further, it generates recommendations/triggers optimal code generation resulting in improved performance.

Figure 3A:
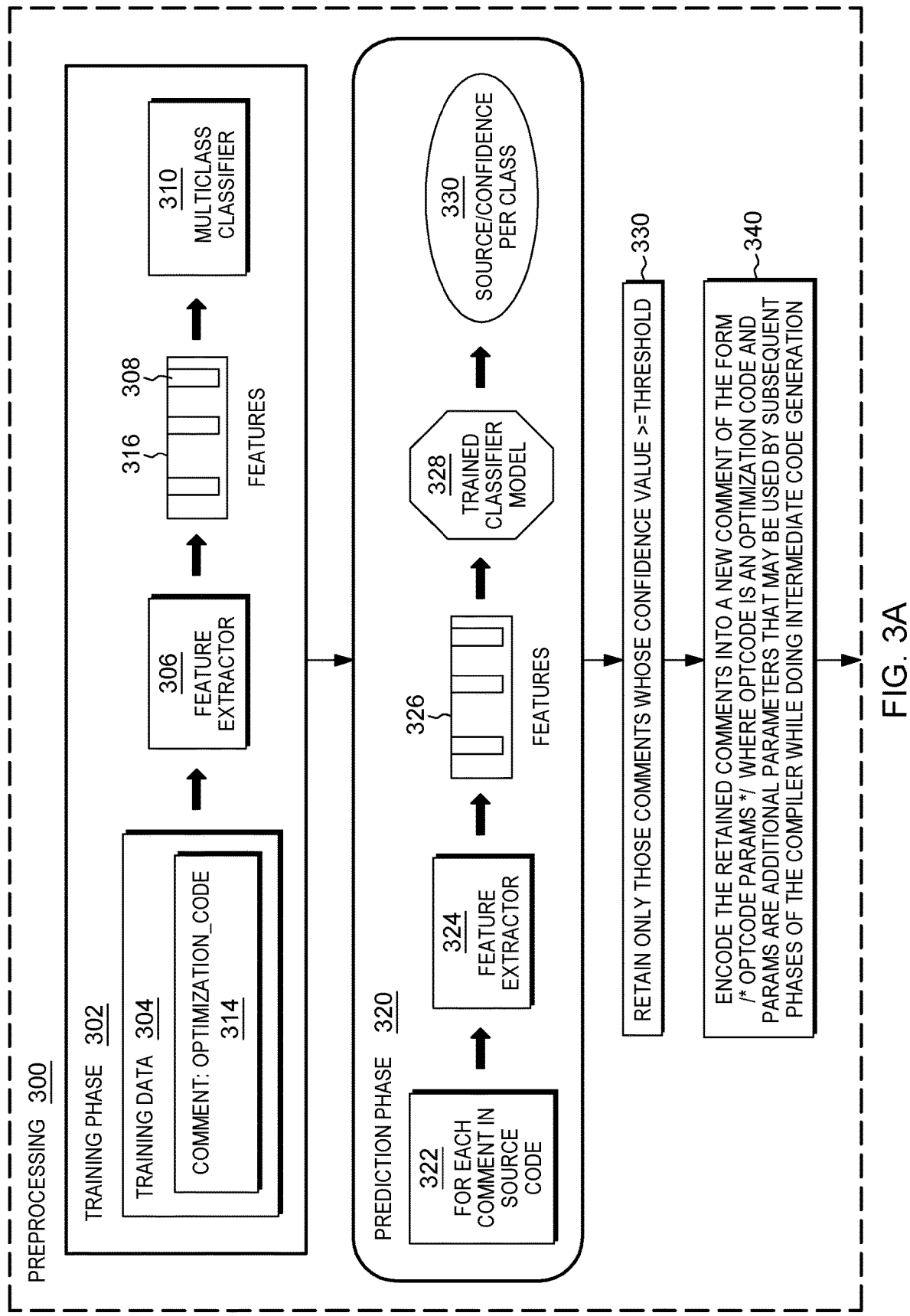
FIG. 3A depicts one example of preprocessing phases performed in accordance with an aspect of the present invention.

As one example, with reference to FIG. 3A, a preprocessing phase 300 includes a plurality of phases, such as, for instance, a training phase 302, a prediction phase 320, a retaining phase 330 and an encoding phase 340. In one particular example, training phase 302 and prediction phase 320 are part of a supervised multiclass classification technique.

In one particular example, there is a finite set (size N) of compiler optimizations. Each optimization is treated as a class in the context of the multiclass classification technique, and each optimization is associated with an OPTIMIZATION_CODE. This OPTIMIZATION_CODE can map to a) a recommendation to a programmer in the form of compiler flags, pragmas; and/or (b) semantic actions that influence intermediate code generation. Example optimization codes include:

| OPTIMIZATION_CODE NNNN-digit-code | OPTIMIZATION_DESCRIPTION Description |
|---|---|
| 4123 | Branch optimization in case of switch statement |
| 2314 | Indirect call promotion |
| . . . | . . . |

During training phase 302, training data 304 is input to a feature extractor 306, which extracts features 308 that are input to a multiclass classifier 310. For instance, a training data set 304 is created by one or more programmers and includes examples of comments and associated optimization codes. In one example, the training data set is a collection of tuples, and each tuple 314 is of the form [Comment: OPTIMIZATION_CODE]. The example comments are classified into classes, which are input to the multiclass classifier. The multiclass classifier is trained to build a training model. It classifies the comments into classes and associates the comments with compiler optimizations or recommendations.

One example of a training set for, e.g., a branch optimization for a switch case statement includes:

```
Void func ( ) {
    State=Prereq( ) ;
    Switch (State) {
        case 'a':              // This case is most often taken
            Val=x+y−z;
            ...
            Break;
        case 'b': Val=x*10;
            ...
            Break;
    ......
        Default : ......
        }
}
```

The training set includes, for instance:
[This case is most often taken, 4123]
[This case is in hot path, 4123]
[This switch case is frequently executed, 4123]
[Over 80% this switch case is executed, 4123]
. . .

From each tuple 314, a feature vector 316 is extracted, which is used to build a model where the classifier learns from the training data. For instance, each comment of tuple 314 is fed to a feature extractor 306, which extracts features 308 from comments. Features are extracted by breaking comments into words. Words for a feature vector are filtered out, or else it leads to an increase in the dimension of the vector.

Example of feature words extracted from comments include:

| COMMENTS | FEATURE WORDS |
| --- | --- |
| This case is most often taken | 'case' 'most' 'often' 'taken' |
| This case is in hot path | 'case' 'in' 'hot' 'path' |
| This switch case is frequently executed | 'frequently' 'executed' |
| Over 80% this switch case is execute | 'over' '80%' 'case' 'executed' |

Feature vector 316 is a combination of each of such feature words. The presence/absence of feature words in comments forms the feature vector and are encoded into a bitmap. Each comment is labeled with an OPTIMIZATION_CODE (which points to a compiler optimization).

The comments may have an identifier, e.g., name of class, variable, function, etc., which may be used to trigger optimization, and hence, it is retained and passed as a parameter along with OPTIMIZATION CODE or the OPTCODE.

This feature vector 316 is input to a multiclass classifier 310, which uses techniques, like Naïve Bayes, Neural Networks and SVM (Support Vector Machines) to build a model. The multiclass classifier uses the training input to train this model, referred to as the trained classifier model herein. The trained model then can understand the different types of comments and classify them to the different classes to which they may belong.

In one embodiment, the training phase is a one time operation. Once the model is created, it is later used for prediction. The training phase may be adapted to accommodate newer comments and optimizations.

During a next phase, prediction phase 320, for each comment 322 in the source code (or select comments), feature words are extracted via a feature extractor 324 and a feature vector 326 is generated. Feature vector 326 is passed as input to a trained classifier model 328 (built in training phase 302), which provides a score/confidence 320 per class. The scores/confidences are provided by the trained classifier model that takes as input the feature vectors pertaining to the comments. For example, a comment that is in the source code is input to the trained classifier model to determine a class this comment best fits and a confidence level is provided (e.g., a certain percentage of confidence that it fits in this class).

During retaining phase 330, the comments whose confidence value is, e.g., greater than or equal to a defined threshold (e.g., 80%), are retained. If a score value is greater than or equal to a confidence threshold value, an encoding replaces the comment; if not, the comment is removed from the program and it is not allowed to pass on to subsequent phases. Other thresholds and/or other determinations of confidence are possible (e.g., the confidence value could be less than a threshold, equal to or have another relationship). Other possibilities exist.

The retained comments are encoded in an encoding phase 340. During the encoding phase, the retained comments are replaced with an encoding of the comment. One example encoding is of the form /* OPTCODE params */, where OPTCODE is an optimization code (e.g., NNNN) and params are additional parameters that may be used by subsequent phases of the compiler while doing intermediate code generation. In other embodiments, the parameters are optional. Other variations are also possible.

For example:

```
/* This function pointer most often calls __addFactor2( ). */
int sum = (*functionPtr) (2, 3);
```

Will be be translated into:

```
/* 2314 __addFactor2 */
int sum = (*functionPtr) (2, 3);
```

Where 2314 is an OPTIMIZATION_CODE (OPTCODE) for an indirect call promotion, with the parameter_addFactor2.

Figure 3B:
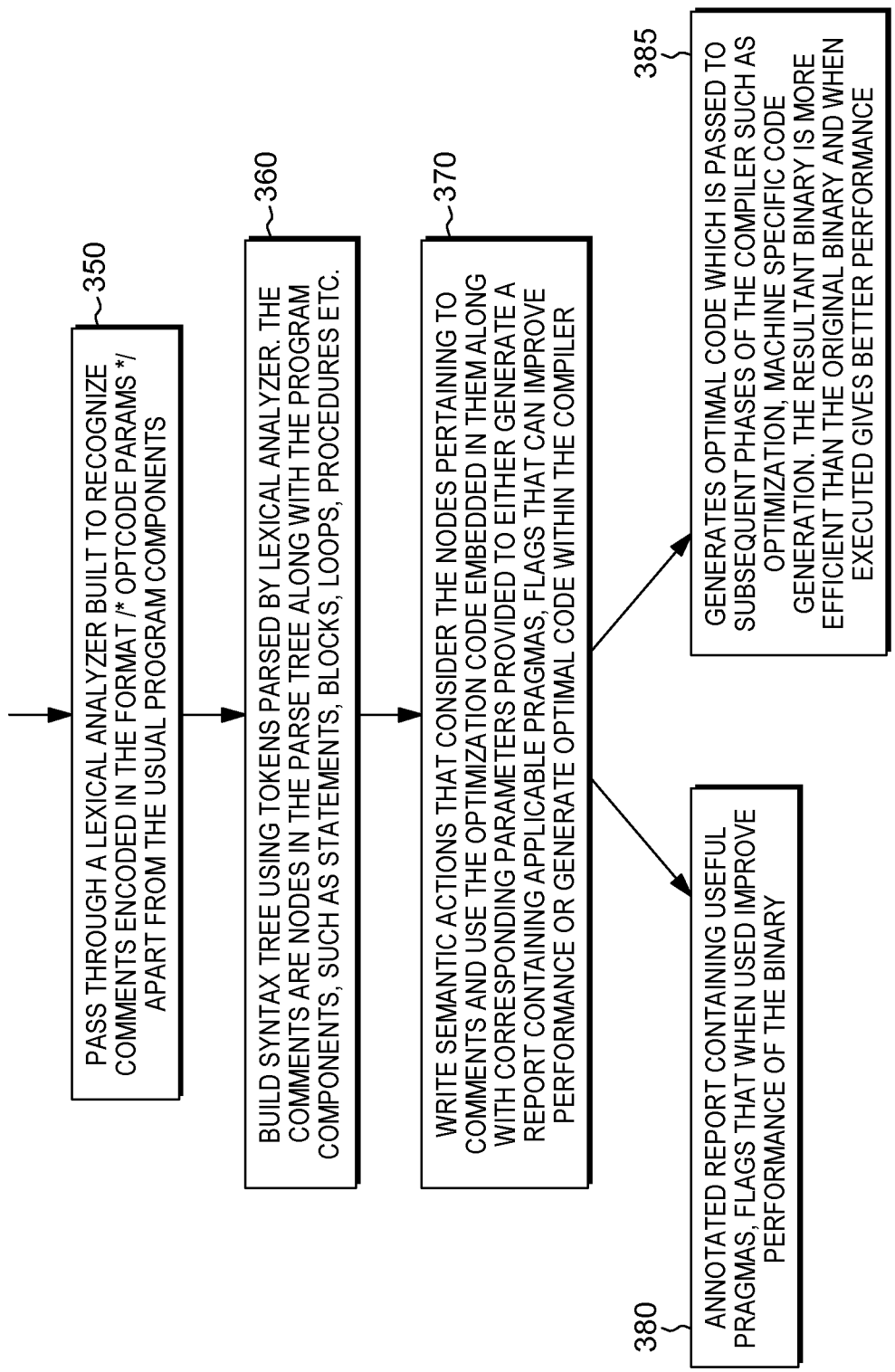
FIG. 3B depicts one example of compilation phases used in accordance with an aspect of the present invention.

In current compilers, comments would remain as they are; however, in accordance with an aspect of the present invention, useful comments (e.g., those comments that provide information about the source code fragment with respect to the values of its variables, branch direction, data size, hotness, etc.) are replaced by an encoded version and are part of the program. The encoded retained comments are passed to a lexical analyzer phase 350, as depicted in FIG. 3B. During the lexical analyzer phase, the lexical analyzer, in accordance with an aspect of the present invention, recognizes comments of, e.g., the form /* OPTCODE params */. Based on recognizing these comments by the lexical analyzer, they are retained. Other comments are removed from the program by the lexical analyzer.

In a next phase 360, a syntax or parse tree is built by the compiler using tokens parsed by the lexical analyzer. The comments are nodes in the parse tree along with the program components, such as statements, blocks, loops, procedures, etc.

For instance, in accordance with an aspect of the present invention, comments are active entities in the program and define attributes from information encoded within comments that are output from the multiclass classifier. The comments pertaining to a program statement are output in such a way that they occur just before that statement. The grammar is changed to recognize such comments and as a result, the comment /* xxxx */ figures as part of the parse tree as a child of the parent/peer of the statement pertaining to that comment.

In a next phase 370, the semantic analysis phase, semantic actions are written that consider the nodes pertaining to comments and use the optimization codes embedded in them along with corresponding parameters provided to either generate a report 380 containing applicable pragmas and/or flags that can improve performance or generate optimal code 385 within the computer.

The semantic analysis phase generates semantic actions, performs type checking and ultimately leads to generation of intermediate code. Further, in accordance with an aspect of the present invention, additional tasks are performed, including, for instance:

Generating recommendations to the user in a log file depending on the existence of flags/pragmas corresponding to the insight received from the comments. For instance, an annotated report 380 may be generated that includes useful pragmas and/or flags that when used improve performance of the code (e.g., binary).
   Generating more optimal intermediate code compared to the original code based on the insights received from the comments. For instance, optimal code 385 is automatically generated by the processor, which is passed to subsequent phases of the compiler, such as optimization and/or machine specific code generation. The resultant binary is more efficient than the original binary and when executed provides improved performance.

In order to accomplish this, the semantic analysis phase uses inherited and synthesized attributes to pass on the intelligence of the comments to the intermediate code generation phase of the compiler. For this reason, the location of the comments are useful, and by their proximity to the relevant statements in the program, these attributes may be used as a vehicle to transfer the intelligence from comments about the statements to the way the code for the statements is generated.

The following examples provide additional details on how attributes are used to carry out the optimal code generation/providing of recommendations:

Example 1: An Example for Generating a Suggestion to the User in a Log File

Often, data structures are defined in programs with larger than required sizes. These data structures could represent states in a program or squares on a chess board. By default, programmers assign types for data structures as int (integer). However, the number of possible states for that variable can be much less than MAXINT or 2^64−1. For example, it is observed that information representing states that indicate a number of possible values in a chess board and in such programs is included as part of the comments. In such cases, these comments can be leveraged to provide recommendations of using a much smaller size for the variables compared to the original type.

```
/* Number of possible states is 100 */
int states[64];
```

Can be translated into:

```
/* 10032 2 100 */
int states[64];
```

Where 10032 can map to a memory foot print reduction and 2 and 100 indicates log 2(100) bits are sufficient to store every element of the states array.

Semantic actions for the same:

```
Type-decln -> Type Varlist
Type -> Type1 int
Type1 -> /* N1 N2 N3 */ {
           if(N2 == 10032 && N1==2) {
              Set Type1.attribute to a data type which is large enough
              to hold log2 (N3) bits
           }
        }
Type-> Type1 int {
           If Type1.attribute is not int, provide a recommendation to the
           user to use Type1.attribute instead of int which will occupy less
           memory space
        }
```

Example 2: An Example for Influencing Ordering of Statements During Intermediate Code Generation

```
Void func (... .args... .)                      Void func (... .args... .)
{                                               {
  Pre_func( );                                    Pre_func( );
  ......                                          ......
  // This if statement is almost always true =>   /* 10043 1 */
  If (a > b) {                                    If (a> b) {
    C=a*b+f(a,b);                                   C=a*b+f(a,b);
  }                                               }
  else c=d−b;                                     Else c=d−b;
}                                               }
```

Semantic actions for the same:

```
Stmt -> /* N1 N2 */ if-Stmt1
        {
          if (N1==10043 && N2==1)
          {
            if-stmt1.mostoftentrue=1;
          } else {
            if-stmt1.mostoftenfalse=1;
          }
if-Stmt1-> if (cond) {stmt1} else {stmt2}
        {
          if (Stmt1.mostoftentrue == 1)
          {
            Emit IR as if there was a builtin_expect (cond,1)
            ...
          }
          if (Stmt1.mostoftenfalse==1)
```

-continued

```
    {
        Emit IR as if there was a builtin_expect (cond,0)
...
    }
}
```

_builtin_expect is a language extension and is supported by XL, GCC and LLVM compilers. IR is internal representation.

If the programmer specifies _builtin_expect (cond, 1), it indicates cond is true most of the time and causes the compiler to generate optimal code reducing branch penalties.

In addition to the basic optimizations, many compilers support profile directed feedback based optimizations. These optimizations target the paths that are most frequently executed. Such paths are detected based on profile information that is collected over runs on training data. In accordance with an aspect of the present invention, an alternative means of detecting such paths is provided that uses information in comments. One such comment is taken from an actual application used today:

```
if (len <= 16 && available >= 16 + kMaximumTagLength &&
    space_left >= 16 && output_iov_[curr_iov_index_].iov_len -
    curr_iov_written_ >= 16) {
    // Fast path, used for the majority (about 95%) of invocations.
    char* ptr = GetIOVecPointer(curr_iov_index_, curr_iov_written_);
    UnalignedCopy128(ip, ptr);
    curr_iov_written_ += len;
    total_written_ += len;
}
```

Example 3: An Example for Recommending Pragmas that Influence Optimization

```
// Most often func is called with parameter 100
Void func (int a) {
...
}
```

Is encoded into:

```
/* 10054 a 100 */
  Void func(int a ) {
...
}
Stmt -> /* N1 N2 N3 */ ret-type function-name (paramlist) {
  If (N1==10054) {
    Provide a recommendation to use pragma expected_value
    (N2.value, N3.value)
}
``` expected_value is a pragma recognized by the XL compiler and is documented in the compiler manuals. expected_value (var, X) tells the compiler that most often the variable var is expected to have the value X. Accordingly, this helps the compiler to carry out additional optimizations.

Example 4: An Example for Recommending Flags that Influence Optimization

```
Code from game GO
/* possible contents of a square */
enum square_t {
BLACK = 0, WHITE = 1, EMPTY = 2, INVAL = 3
};
```

Is encoded into:

```
// 10064 square_t 4
enum square_t {
BLACK = 0, WHITE = 1, EMPTY = 2, INVAL = 3
};
```

Semantic actions for the same:

```
enum-comment-> /* N1 Type N2 */ {enum-comment.kind=10064;
enum-comment.type=Type.val; enum-comment.size=N2.val}
    Decln -> enum-comment enum-decln {enum-decln.kind=enum-comment.kind;
enum-decln.type=enum-comment.type; enum-decln.size=enum-comment.size;}
        enum-decln -> enum data_name {Var1=Value1, Var2=Value2 ... Varn=Valuen}
            {
            If enum-decln.kind==10064 {
            if enum-decln.size can be stored in one byte
                emit recommendation to use flag -qenum=1
            else if enum-decln.size can be stored in two bytes
                emit recommendation to use flag -qenum=2
            ....
            }
        }
```

As described herein, in accordance with one or more aspects, comments that offer insights which can improve the performance of the program containing those comments are recognized and translated into meaningful structures, which the compiler can use to generate efficient code or suggest compiler flags or pragmas to the user.

In one aspect, a capability is provided for enabling a compiler to optimize the creation of binary codes by extracting useful information from source code comments and translating those comments into structure codes recognizable by compiler phases.

As one example, useful information (syntax or features) is identified/extracted from source code comments or pragmas by parsing the comments using machine learning techniques. Scores are assigned to the comments using a classifier model, and useful portions of the comments are classified based on scores assigned to each comment. Comments with a high confidence score are retained and treated as actual program entities. These comments figure as parse tree nodes and facilitate assigning specific attributes to the parse tree nodes, which result in generating recommendations to the user and/or influence code generation. Extracted information is dynamically converted from the comments into intermediate codes or program codes recognizable by the compiler. The converted program codes are recommended to compilers for optimizing the creation of binary codes.

Comments are recognized using machine learning models specifically designed to single out those that can be used by the compiler to trigger certain optimizations. These comments are passed down into subsequent compiler passes. The compiler chooses this information and either generates useful pragmas/flags as recommendations to the user for better performance or it triggers generation of optimal code from within the compiler.

In one aspect, program comments (e.g., plain natural language text comments) that contain hidden information are identified that can be used to trigger optimizations within the compiler or help generate recommendations to users in terms of flags or pragmas that can result in improved performance.

In a further aspect, a comment-optimization map file may be generated during the preprocessing phase. This file may contain metadata of the optimizations/suggestions triggered by comments. The metadata may contain, for example, the following information for each comment that was categorized as useful for optimization by the compiler: source-line::OPTCODE list of parameters. Given just the map file and unchanged source, the preprocessor can use the map file to decide which comments were reduced to which optimizations/suggestions including its parameters. This way, the same binary can be deterministically obtained at any snapshot in time.

In yet a further aspect, the machine learning model and the preprocessor are treated as an integral part of the compiler and both of them are version controlled together to ensure the same binary at a snapshot in time.

In another aspect, profiling and validating may be provided which compares the hints coming in from profile information and the hints from comment analysis to determine which proposed optimizations are to be used. This profiling and validating is run, e.g., when the user observes a performance degradation based on using the comment analysis, which is, e.g., activated using a new compiler flag "-muse_comments" that when used to compile, enables the compiler to make use of information available in the comments for triggering optimizations. Once the validation points to an unacceptable comment and the effect of the comment is muted, any future compile run need not to have to do the full profile feedback again.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 4A-4B.

Referring to FIG. 4A, in one embodiment, a translation component of a processor of the computing environment obtains one or more encoded comments to be used by the translation component in providing one or more optimizations to optimize processing within the computing environment (400). The one or more encoded comments include one or more comments of a computer program determined to have information to be provided to the translation component and encoded to provide the one or more encoded comments (402). The translation component uses the one or more encoded comments to optimize processing within the computing environment (404).

As one example, the using the one or more encoded comments to optimize processing includes using the one or more encoded comments in translating code of the computer program to machine-readable code (406). In one example, the machine-readable code includes one or more code optimizations based on the one or more encoded comments (408).

As another example, the using the one or more encoded comments to optimize processing includes using the one or more encoded comments to generate a report indicating one or more changes to be made to the computer program to optimize processing (409). By generating the report, the computer program may be changed, improving the code, and therefore, improving processing within the computing environment.

In one embodiment, based on obtaining the one or more encoded comments, a structure is built (410). The structure includes a plurality of nodes (412), and the plurality of nodes include one or more nodes for one or more program components of the computer program and one or more nodes for the one or more encoded comments (414).

Further, in one embodiment, with reference to FIG. 4B, the obtaining the one or more encoded comments includes obtaining the one or more encoded comments from a preprocessing component of the processor (420). The preprocessing component determines the one or more comments of the computer program to be retained for use by the translation component (422), and encodes the one or more comments to provide the one or more encoded comments (424).

The determining the one or more comments to be retained includes, for instance, determining that the one or more comments satisfy a confidence threshold indicating that the one or more comments are predicted to have information useful in optimizing processing (426). Further, in one example, the encoding includes providing, for a comment of the one or more comments, an optimization code and one or more parameters for the comment, to provide an encoded comment (428).

As examples, the preprocessing component is part of the translation component or separate from but coupled to the translation component (430).

Other variations and embodiments are possible.

Figure 5A:
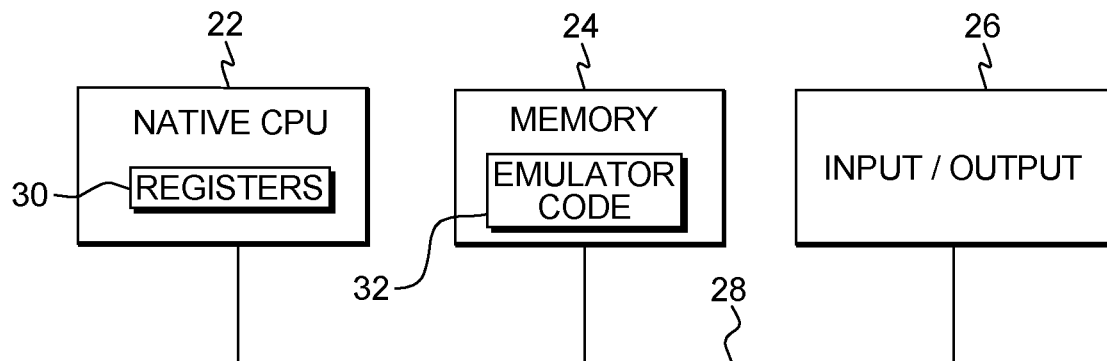
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 5B:
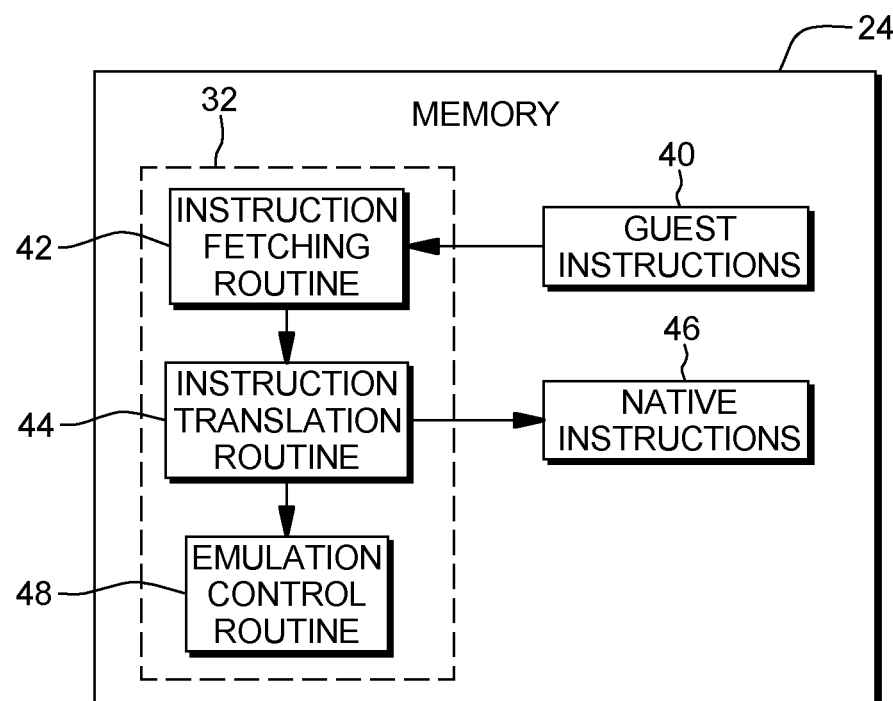
FIG. 5B depicts further details of the memory of FIG. 5A.

Further details relating to emulator code 32 are described with reference to FIG. 5B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
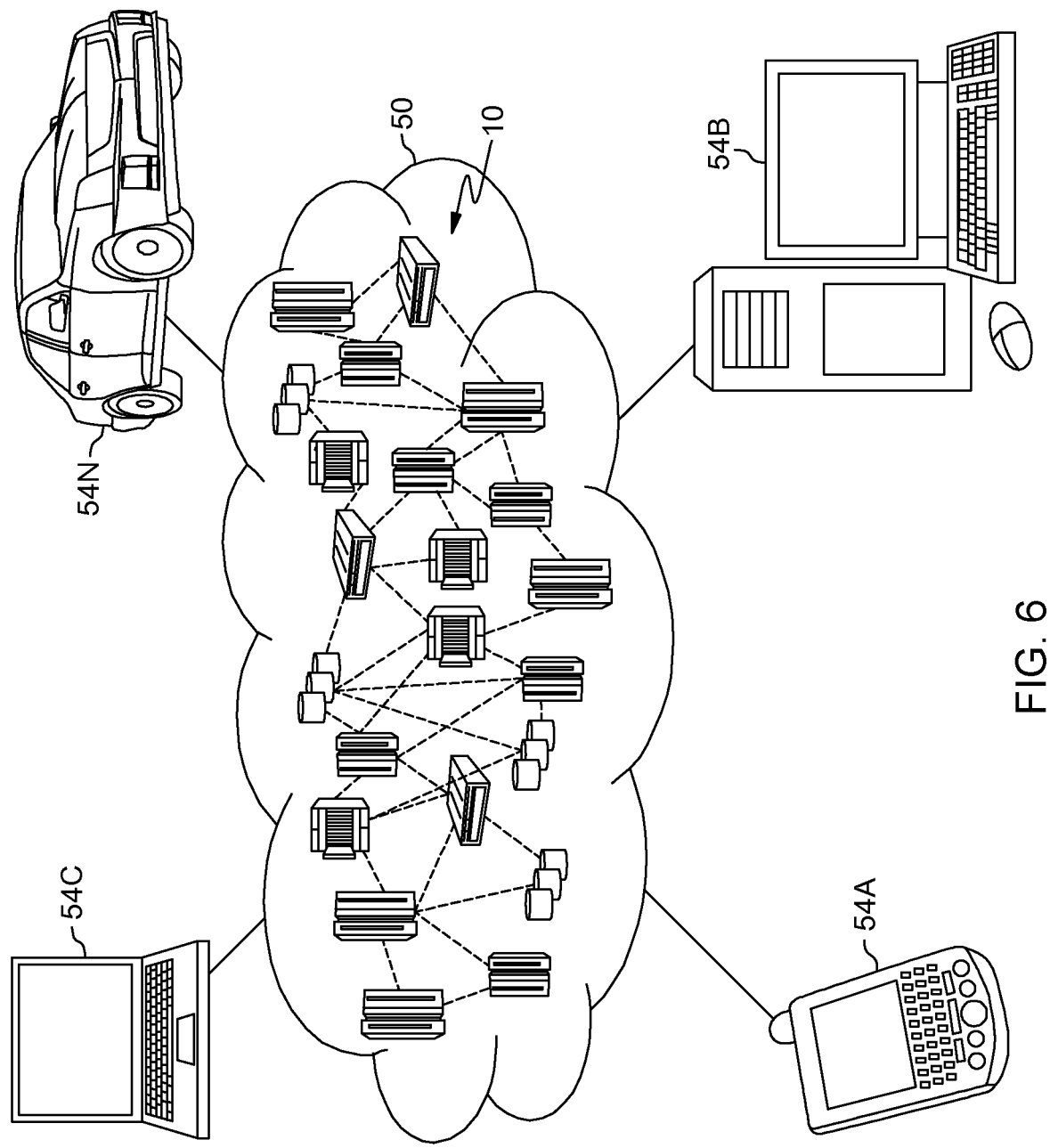
FIG. 6 depicts one embodiment of a cloud computing environment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
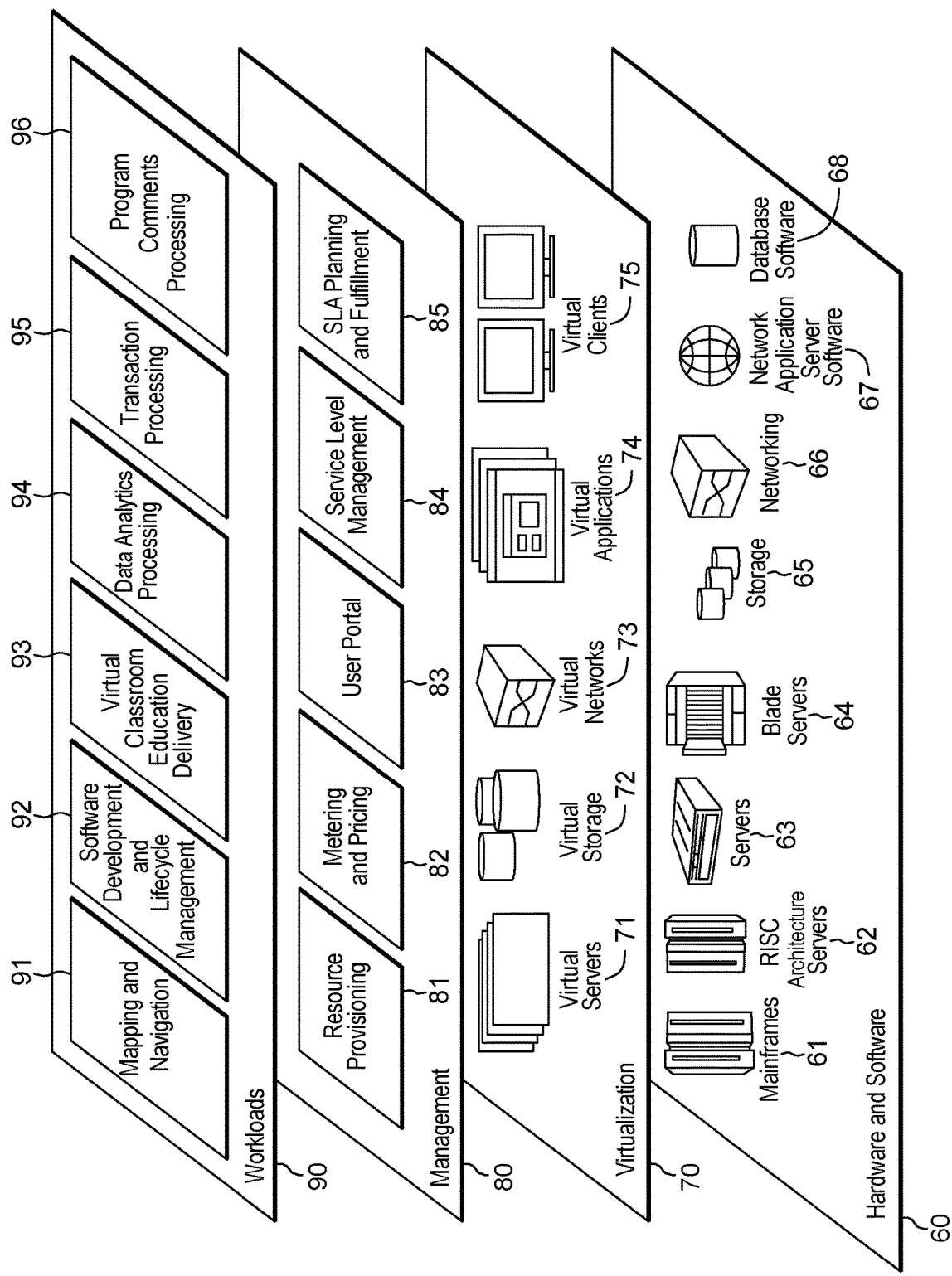
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program comments processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other types of training techniques and/or classifiers may be used. Yet further, other mechanisms for determining which comments to retain and/or how to encode the retained comments may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
a computer readable storage medium readable by a processing circuit and storing instructions for performing a method comprising:
obtaining, by a translation component of a processor of the computing environment, one or more encoded comments to be used by the translation component in providing one or more optimizations to optimize processing within the computing environment, the one or more encoded comments including one or more comments of a computer program determined to have information to be provided to the translation component and encoded to provide the one or more encoded comments, the obtaining being based, at least in part, on at least one phase of translation in which one or more feature vectors pertaining to the one or more comments are input to a trained classifier model to provide one or more confidence values satisfying a confidence threshold indicating that the one or more comments are correctly classified to have information useful in optimizing processing, and wherein comments of the computer program determined not useful in optimizing processing of the computer program are removed from the computer program and not passed to a subsequent phase of translation;
using, by the translation component, the one or more encoded comments to optimize processing within the computing environment; and
wherein the using the one or more encoded comments to optimize processing includes using the one or more encoded comments in translating code of the computer program to machine-readable code.

2. The computer program product of claim 1, wherein the machine-readable code includes one or more code optimizations based on the one or more encoded comments.

3. The computer program product of claim 1, wherein the using the one or more encoded comments to optimize processing includes using the one or more encoded comments to generate a report indicating one or more changes to be made to the computer program to optimize processing.

4. The computer program product of claim 1, wherein the method further includes building a structure, based on obtaining the one or more encoded comments, wherein the structure includes a plurality of nodes, the plurality of nodes including one or more nodes for one or more program components of the computer program and one or more nodes for the one or more encoded comments.

5. The computer program product of claim 1, wherein the obtaining the one or more encoded comments comprises obtaining the one or more encoded comments from a preprocessing component of the processor, and wherein the method further comprises:
determining, by the preprocessing component, the one or more comments of the computer program to be retained for use by the translation component; and
encoding, by the preprocessing component, the one or more comments to provide the one or more encoded comments.

6. The computer program product of claim 5, wherein the determining the one or more comments to be retained comprises determining that the one or more comments satisfy the confidence threshold indicating that the one or more comments are predicted to have information useful in optimizing processing.

7. The computer program product of claim 5, wherein the encoding comprises providing, for a comment of the one or more comments, an optimization code and one or more parameters for the comment, to provide an encoded comment.

8. The computer program product of claim 5, wherein the preprocessing component is part of the translation component.

9. The computer program product of claim 5, wherein the preprocessing component is separate from but coupled to the translation component.

10. A computer system for facilitating processing within a computing environment, the computer system comprising:
a memory; and
a processor in communication with the memory, wherein the computer system is configured to perform a method, said method comprising:

obtaining, by a translation component of the processor, one or more encoded comments to be used by the translation component in providing one or more optimizations to optimize processing within the computing environment, the one or more encoded comments including one or more comments of a computer program determined to have information to be provided to the translation component and encoded to provide the one or more encoded comments, the obtaining being based, at least in part, on at least one phase of translation in which one or more feature vectors pertaining to the one or more comments are input to a trained classifier model to provide one or more confidence values satisfying a confidence threshold indicating that the one or more comments are correctly classified to have information useful in optimizing processing, and wherein comments of the computer program determined not useful in optimizing processing of the computer program are removed from the computer program and not passed to a subsequent phase of translation;

using, by the translation component, the one or more encoded comments to optimize processing within the computing environment; and wherein the using the one or more encoded comments to optimize processing includes using the one or more encoded comments in translating code of the computer program to machine-readable code.

11. The computer system of claim 10, wherein the using the one or more encoded comments to optimize processing includes using the one or more encoded comments to generate a report indicating one or more changes to be made to the computer program to optimize processing.

12. The computer system of claim 10, wherein the obtaining the one or more encoded comments comprises obtaining the one or more encoded comments from a preprocessing component of the processor, and wherein the method further comprises:

determining, by the preprocessing component, the one or more comments of the computer program to be retained for use by the translation component; and encoding, by the preprocessing component, the one or more comments to provide the one or more encoded comments.

13. The computer system of claim 12, wherein the encoding comprises providing, for a comment of the one or more comments, an optimization code and one or more parameters for the comment, to provide an encoded comment.

14. A computer-implemented method of facilitating processing within a computing environment, the computer-implemented method comprising:

obtaining, by a translation component of a processor of the computing environment, one or more encoded comments to be used by the translation component in providing one or more optimizations to optimize processing within the computing environment, the one or more encoded comments including one or more comments of a computer program determined to have information to be provided to the translation component and encoded to provide the one or more encoded comments, the obtaining being based, at least in part, on at least one phase of translation in which one or more feature vectors pertaining to the one or more comments are input to a trained classifier model to provide one or more confidence values satisfying a confidence threshold indicating that the one or more comments are correctly classified to have information useful in optimizing processing, and wherein comments of the computer program determined not useful in optimizing processing of the computer program are removed from the computer program and not passed to a subsequent phase of translation;

using, by the translation component, the one or more encoded comments to optimize processing within the computing environment; and wherein the using the one or more encoded comments to optimize processing includes using the one or more encoded comments in translating code of the computer program to machine-readable code.

15. The computer-implemented method of claim 14, wherein the using the one or more encoded comments to optimize processing includes using the one or more encoded comments to generate a report indicating one or more changes to be made to the computer program to optimize processing.

16. The computer-implemented method of claim 14, wherein the obtaining the one or more encoded comments comprises obtaining the one or more encoded comments from a preprocessing component of the processor, and wherein the method further comprises:

determining, by the preprocessing component, the one or more comments of the computer program to be retained for use by the translation component; and encoding, by the preprocessing component, the one or more comments to provide the one or more encoded comments.

17. The computer-implemented method of claim 16, wherein the encoding comprises providing, for a comment of the one or more comments, an optimization code and one or more parameters for the comment, to provide an encoded comment.

* * * * *